US012130393B2

(12) United States Patent
Nelson et al.

(10) Patent No.: US 12,130,393 B2
(45) Date of Patent: Oct. 29, 2024

(54) LAYERED SCINTILLATING NEUTRON DETECTOR

(71) Applicant: The United States of America, as represented by the Secretary of the Navy, San Diego, CA (US)

(72) Inventors: Kyle Alan Nelson, San Diego, CA (US); Stephanie Lam, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 179 days.

(21) Appl. No.: 17/958,030

(22) Filed: Sep. 30, 2022

(65) Prior Publication Data

US 2024/0111065 A1  Apr. 4, 2024

(51) Int. Cl.
*G01T 1/20* (2006.01)
*G01T 1/164* (2006.01)
*G01T 3/06* (2006.01)
*G01T 3/08* (2006.01)

(52) U.S. Cl.
CPC .............. *G01T 3/06* (2013.01); *G01T 1/1645* (2013.01); *G01T 1/20181* (2020.05); *G01T 1/20184* (2020.05); *G01T 1/20187* (2020.05); *G01T 1/20188* (2020.05)

(58) Field of Classification Search
CPC ......... G01T 1/16; G01T 1/164; G01T 1/1641; G01T 1/1642; G01T 1/1644; G01T 1/1645; G01T 1/1647; G01T 1/20; G01T 1/2006; G01T 1/2018; G01T 1/20181; G01T 1/20182; G01T 1/20187; G01T 1/20188; G01T 1/29; G01T 1/2907; G01T 1/2914; G01T 1/2921; G01T 1/2928; G01T 1/2935; G01T 3/06; G01T 3/065; G01T 3/08; G01T 3/085; G01T 1/202
USPC ............ 250/370.05, 370.09, 370.11, 370.12
See application file for complete search history.

(56) References Cited

U.S. PATENT DOCUMENTS

| | | | | |
|---|---|---|---|---|
| 4,883,956 A | * | 11/1989 | Melcher | G01T 1/202 250/269.2 |
| 6,373,066 B1 | * | 4/2002 | Penn | G01T 3/02 250/363.02 |
| 7,244,947 B2 | * | 7/2007 | Polichar | G01T 3/06 250/370.11 |

(Continued)

OTHER PUBLICATIONS

Montag, Benjamin W., et al. "Recent progress in the commercialization of the Li Foil multi-wire proportional counter neutron detectors." Radiation Physics and Chemistry 155 (2019): 158-163.
Nelson, Kyle A., et al. "A modular large-area lithium foil multi-wire proportional counter neutron detector." Radiation Physics and Chemistry 116 (2015): 165-169.

(Continued)

*Primary Examiner* — Allen C. Ho
(74) *Attorney, Agent, or Firm* — Naval Information Warfare Center, Pacific; Kyle Eppele; Paul C. Oestreich

(57) ABSTRACT

A detector detects at least one neutron. The detector includes at least one thin absorption layer each including an absorption material for absorbing the neutron and then radioactively decaying into energetic byproducts. The detector includes at least one emission layer each including a solid scintillation material for converting the energetic byproducts into photons. The detector includes a sensor for detecting the photons.

20 Claims, 2 Drawing Sheets

(56) References Cited

U.S. PATENT DOCUMENTS

| | | | | |
|---|---|---|---|---|
| 7,521,686 | B2* | 4/2009 | Stuenkel | G01T 3/06 250/390.11 |
| 7,741,612 | B2* | 6/2010 | Clothier | G01T 1/202 250/390.01 |
| 7,804,072 | B2* | 9/2010 | Czirr | G01T 3/06 250/390.11 |
| 8,389,941 | B2* | 3/2013 | Bendahan | G01T 1/208 250/363.02 |
| 8,436,315 | B1* | 5/2013 | Grodzins | G01T 3/06 250/390.11 |
| 8,519,350 | B2 | 8/2013 | McGregor | |
| 8,748,830 | B2* | 6/2014 | Kusner | G01T 1/2008 250/367 |
| 8,963,094 | B2* | 2/2015 | Gozani | H01J 43/30 250/363.02 |
| 9,046,613 | B2* | 6/2015 | Ramsden | G01T 3/06 |
| 9,268,044 | B2* | 2/2016 | Ramsden | G01T 3/06 |
| 9,817,138 | B2 | 11/2017 | McGregor | |
| 10,107,934 | B2* | 10/2018 | De Vita | G01V 5/281 |
| 10,126,442 | B2* | 11/2018 | Ramsden | G01T 1/20 |
| 10,520,610 | B2 | 12/2019 | Lam | |
| 10,859,718 | B1* | 12/2020 | Nagarkar | G01T 1/29 |
| 11,009,616 | B2* | 5/2021 | Ramsden | G01T 3/06 |

OTHER PUBLICATIONS

Nelson, Kyle A., et al. "A suspended boron foil multi-wire proportional counter neutron detector." Nuclear Instruments and Methods in Physics Research A 767 (2014): 14-18.

Nelson, Kyle A., et al. "Characterization of a mid-sized Li foil multi-wire proportional counter neutron detector." Nuclear Instruments and Methods in Physics Research A 762 (2014): 119-124.

Nelson, Kyle A., et al. "Thermal neutron response and theoretical comparison of LiF coated aluminized Mylar." Nuclear Instruments and Methods in Physics Research Section A 762 (2014): 130-134.

Nelson, Kyle A., et al. "Investigation of a lithium foil multi-wire proportional counter for potential 3He replacement." Nuclear Instruments and Methods in Physics Research Section A 669 (2012): 79-84.

Lam, Stephanie, et al. "A high-performance CLYC (Ce)-PVT composite for neutron and gamma detection." IEEE Transactions on Nuclear Science 65.1 (2018): 609-615.

Eljen Technology, "Fast Neutron Detector EJ-410." Oct. 2022, retrieved from Internet <https://eljentechnology.com/images/products/data_sheets/EJ-410.pdf> on Jan. 6, 2023.

Eljen Technology, "Thermal Neutron Detector EJ-420." Oct. 2022, retrieved from Internet <https://eljentechnology.com/images/products/data_sheets/EJ-420.pdf> on Jan. 6, 2023.

* cited by examiner

LAYERED SCINTILLATING NEUTRON DETECTOR

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice (619) 553-5118; ssc_pac_t2@navy.mil. Reference Navy Case Number 112962.

BACKGROUND OF THE INVENTION

There is a general need for neutron detectors that are capable of reliable and efficient detection of both low-energy thermal neutrons and high-energy neutrons in a small form factor.

SUMMARY

A detector detects at least one neutron. The detector includes at least one thin absorption layer each including an absorption material for absorbing the neutron and then radioactively decaying into energetic byproducts. The detector includes at least one emission layer each including a solid scintillation material for converting the energetic byproducts into photons. The detector includes a sensor for detecting the photons.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed detectors below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

The inventors have discovered a layered scintillating neutron detector that provides reliable and efficient detection of neutrons including thermal neutrons. The layered scintillating neutron detector of certain embodiments includes thin alternating layers of a solid neutron absorbing material and a solid scintillation material. The thinness of these layers dramatically raises the neutron detection efficiency because the neutron absorbing layers are thin enough so that multiple reaction products escape into the adjacent layers of scintillation material. A light sensor detects photons from multiple reaction products of each individual neutron to reliably, efficiently, and indirectly detect each individual neutron.

Figure 1:
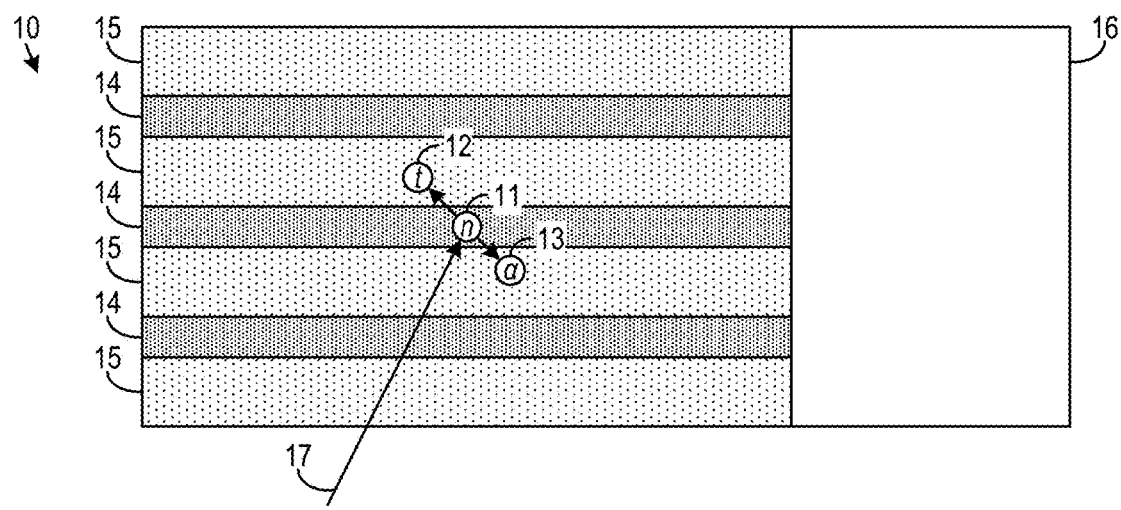
FIG. 1 is a layered scintillating neutron detector in accordance with an embodiment of the invention.

FIG. 1 is a layered scintillating neutron detector 10 in accordance with an embodiment of the invention. The layered scintillating neutron detector 10 detects neutrons, such as the received neutron 11 traveling along a path indicated by arrow 17 detected via intermediate energetic byproducts 12 and 13.

The detector 10 includes one or more thin absorption layers 14. For higher sensitivity, the detector 10 preferably includes multiple thin absorption layers 14. The thin absorption layers 14 each include an absorption material for absorbing the neutron 11 and then radioactively decaying or splitting into the energetic byproducts 12 and 13.

The detector 10 also includes one or more emission layers 15 and a sensor 16. For higher sensitivity, the detector 10 preferably includes multiple emission layers 15. The emission layers 15 each include a solid scintillation material for converting the energetic byproducts 12 and 13 into photons. Sensor 16 detects the photons. In various embodiments, the sensor 16 includes a photomultiplier tube or a silicon photomultiplier for amplifying and detecting the photons.

The received neutron 11 may travel through and perhaps become scattered within many of the layers 14 and 15 before becoming absorbed in the absorption material of a particular one of the thin absorption layers 14, and then radioactively decaying into energetic byproducts 12 and 13. Of course, the neutron 11 could be absorbed in the first encountered one of the thin absorption layers 14. Unavoidably, a received neutron might be absorbed within any one of the emission layers 15 with this absorption possibly not generating any energetic byproducts, but such absorption is extraneous absorption that does not contribute to the sensitivity of the detector 10. Thus, the absorption material of the thin absorption layers 14 preferably has a high cross-section for absorbing neutron 11 and the solid scintillation material of the emission layers 15 preferably has a comparatively low cross-section for absorbing neutron 11.

Often, the energetic byproducts are exactly two energetic byproducts 12 and 13 emitted in opposite directions due to their high energy as compared with the original neutron 11, and also due to conservation of energy and especially conservation of momentum. Although the two energetic byproducts 12 and 13 are emitted in opposite directions, these opposite directions are usually random opposite directions for a particular radioactive decay after absorption of neutron 11. Thus, typically over many independent captures of a low-energy neutron and subsequent radioactive decay, the combined energetic byproducts are statistically emitted uniformly in all directions. However, it will be appreciated that the capture and decay of a single neutron sometimes produces more than two energetic byproducts traveling in various directions.

In one embodiment, the thin absorption layers 14 and the emission layers 15 alternate within a stack in the detector 10, and each of the thin absorption layers 14 is sandwiched between two of the emission layers 15 as shown in FIG. 1. In the frequent decay mode where the energetic byproducts are two energetic byproducts 12 and 13 traveling in opposite directions, the thin absorption layers 14 are sufficiently thin so that it is statistically unlikely that these opposite directions remain within the thin absorption layers 14. Hence, the two energetic byproducts 12 and 13 often travel into two adjacent ones of the emission layers 15, which two different ones of the emission layers 15 together convert the energetic byproducts 12 and 13 from the neutron 11 into the photons detected at sensor 16. Thus, this embodiment improves sensitivity of the detector 10 because all of the byproducts 12 and 13 are often converted into the photons detected at sensor 16.

In one embodiment, not only is the scintillation material of the emission layers 15 a solid, the absorption material of the thin absorption layers 14 is also a solid. This simplifies the manufacture of a rugged detector 10 because the layers 14 and 15 can be adhered together or alternatively held together in a frame with the spacing of the layers 14 and 15 determined by the thickness of the solid layers 14 and 15.

In one embodiment, the absorption material of the thin absorption layers 14 includes $^{10}B$ and the energetic byproducts 12 and 13 of the $^{10}B$ absorbing the neutron 11 are an energetic $^{7}Li$ byproduct 12 and an alpha particle byproduct 13.

In another embodiment, the absorption material of the thin absorption layers 14 includes $^{6}Li$ and the energetic byproducts 12 and 13 of the $^{6}Li$ absorbing the neutron 11 are a triton particle byproduct 12 and an alpha particle byproduct 13. In one example, each of the thin absorption layers 14 consists of a metal foil of the absorption material, which essentially consists of $^{6}Li$. In another example, each of the thin absorption layers 14 consists of a thin sheet of a binder and the absorption material, which essentially consists of a powder of $^{6}LiF$. Thus, example neutron absorption and decay processes include the following:

$$^{3}He + n \rightarrow t + {}^{1}H \quad Q = 0.764 \text{ MeV} \quad (1)$$

$$^{10}B + n \rightarrow {}^{7}Li + \alpha \quad Q = 2.31 \text{ MeV (branch probability 94\%)} \quad (2)$$

$$^{6}Li + n \rightarrow t + \alpha \quad Q = 4.78 \text{ MeV} \quad (3)$$

where Q is the energy released into the kinetic energy of the energetic byproducts 12 and 13 assuming the neutron 11 has comparatively negligible energy, n is a neutron, t is a triton particle, and a is an alpha particle.

In one embodiment, the solid scintillation material of the emission layers 15 is selected from the group consisting of an insulator, a semiconductor, a metal halide crystal, a metal oxide crystal, a salt, a glass, and/or a plastic. For example, the solid scintillation material of the emission layers 15 is ZnS, and an energetic byproduct 12 or 13 deposits energy into a stream of photons each having the energy of the bandgap of the ZnS semiconductor until the kinetic energy of the energetic byproduct 12 or 13 becomes dissipated or until the energetic byproduct 12 or 13 exits the emission layers 15.

Figure 2:
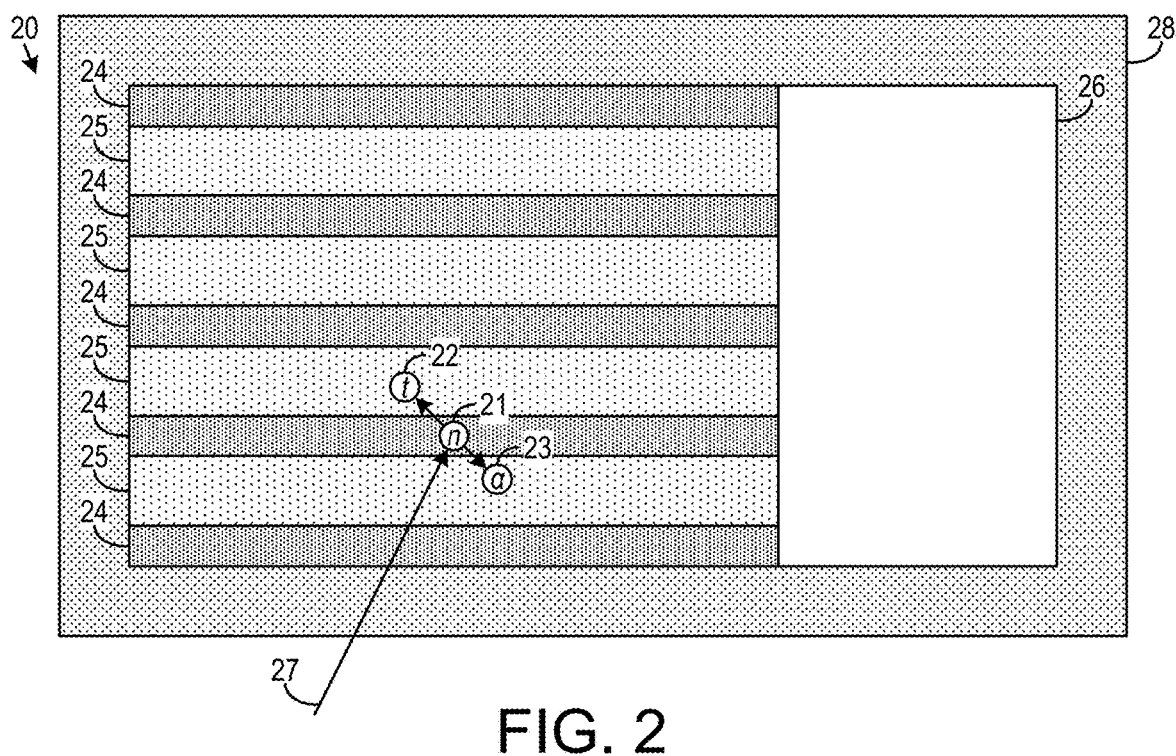
FIG. 2 is a layered scintillating neutron detector in accordance with an embodiment of the invention.

FIG. 2 is a layered scintillating neutron detector 20 in accordance with an embodiment of the invention. FIG. 2 differs from FIG. 1 in two aspects. FIG. 2 adds an opaque reflective coating 28. In FIG. 1 the outer layers among the layers 14 and 15 are both emission layers 15, whereas in FIG. 2 the outer layers among the layers 24 and 25 are both absorption layers 24. In another embodiment, one of the outer layers is an emission layer and the other of the outer layers is an absorption layer.

The detector 20 detects received neutron 21 traveling along a path indicated by arrow 27 via intermediate energetic byproducts 22 and 23. The detector 20 includes the thin absorption layers 24, the emission layers 25, and a sensor 26. Each of the thin absorption layers 24 includes an absorption material for absorbing the neutron 21 and then radioactively decaying into the energetic byproducts 22 and 23. Each of the emission layers 25 includes a solid scintillation material for converting the energetic byproducts 22 and 23 into photons. Sensor 26 detects the photons, and hence indirectly detects the neutron 21.

In one embodiment, the opaque reflective coating 28 surrounds the thin absorption layers 24, the emission layers 25, and the sensor 26. For example, the opaque reflective coating 28 includes a diffuse reflector of Teflon® polytetrafluoroethylene tape or a specular reflector of Vikuiti® Enhanced Specular Reflector. This increases sensitivity because external light is blocked by the opaque reflective coating 28 and internally generated photons that do not directly reach the sensor 26 might reach the sensor 26 after reflection one or more times from the opaque reflective coating 28. Preferably, the opaque reflective coating 28 does not appreciably absorb neutrons, such that neutron 21 still reaches the thin absorption layers 24 unimpeded. In one embodiment, the opaque reflective coating 28 is a thin layer of aluminum just thick enough to block light detectable by sensor 26 and also just thick enough to reflect the light emitted in the emission layers 25 upon conversion of the energetic byproducts 22 and 23 into photons. For example, the opaque reflective coating 28 is a layer of aluminum that is 20 nm thick.

Typically, the thin absorption layers 24 and the emission layers 25 have different refractive indices so a photon undergoes total internal reflection within the higher refractive index layer if the photon's propagation direction happens to lie within a critical angle to parallel to the layers 24 and 25. If the layers 24 and 25 are separated by minimal air gaps, this total internal reflection occurs in each of the layers 24 and 25. The total internal reflection guides some of the internally generated photons to the sensor 26. For those photons propagating outside the critical angle that do not undergo total internal reflection, and for those photons that do undergo total internal reflection but propagate away from the sensor 26, reflection from the opaque reflective coating 28 sometimes guides these photons back to the sensor 26 for increased detection sensitivity.

It will be appreciated that the thin absorption layers 24 need not be identical and the emission layers 25 need not be identical. For example, the thin absorption layers 24 include different thicknesses of different materials for respectively capturing slow and fast neutrons.

Figure 3:
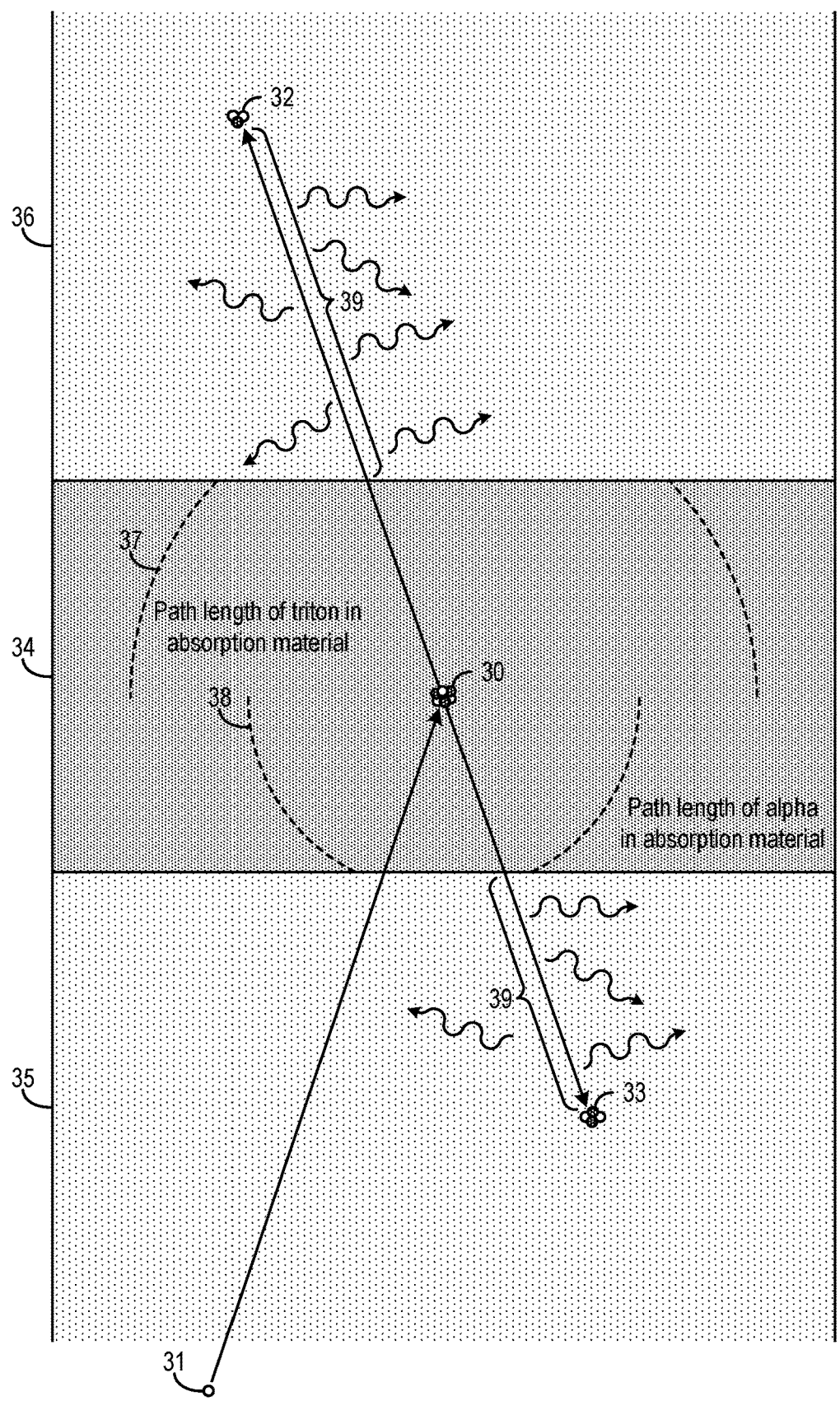
FIG. 3 is an example of an absorption material absorbing a neutron to radioactively decay into energetic byproducts and a solid scintillation material converting the energetic byproducts into photons in accordance with embodiments of the invention.

FIG. 3 is an example of an absorption material 34 absorbing a neutron 31 to radioactively decay into energetic byproducts 32 and 33, and a solid scintillation material 35 and 36 converting the energetic byproducts 32 and 33 into photons in accordance with embodiments of the invention.

In this example, the neutron 31 is absorbed by an atom 30 of the $^{6}Li$, which typically splits immediately into a triton particle byproduct 32 and an alpha particle byproduct 33. Usually, but not always, both the triton particle byproduct 32 and an alpha particle byproduct 33 reach adjacent layers of the solid scintillation material 35 and 36, where the energetic byproducts 32 and 33 are converted into detectable photons.

The triton particle byproduct 32 has an average path length 37 within the absorption material 34 before the triton particle byproduct 32 stops propagating within the absorption material 34 from, for example, scattering collisions. If the thickness of the absorption layer of the absorption material 34 is less than this average path length 37, then regardless of whether the collision point between the neutron 31 and the atom 30 occurs in the center of the thin absorption layer of the absorption material 34 as shown in FIG. 3 or near the boundaries with the adjacent layers of the solid scintillation material 35 and 36, often the triton particle byproduct 32 exits the thin absorption layer of the absorption material 34 and enters either the emission layer of the solid scintillation material 36 as shown in FIG. 3, or enters the emission layer of the solid scintillation material 35 depending upon the random direction of the triton particle byproduct 32.

Similarly, the alpha particle byproduct 33 has an average path length 38 within the absorption material 34. If the thickness of the thin absorption layer of the absorption material 34 is less than this average path length 38, then often the alpha particle byproduct 33 exits the thin absorption layer of the absorption material 34 and enters either the emission layer of the solid scintillation material 35 as shown in FIG. 3, or enters the emission layer of the solid scintillation material 36 depending upon the random direction of the alpha particle byproduct 33.

Because both the triton particle byproduct 32 and the alpha particle byproduct 33 preferably reach the solid scintillation material 35 and 36 to generate photons detected by a sensor, in one embodiment, a thickness of the thin absorption layer of absorption material 34 is less than respective average path lengths 37 and 38 of the energetic byproducts 32 and 33 within the absorption material 34.

The combined average path lengths 37 and 38 of a triton particle byproduct 32 and an alpha particle byproduct 33 is about 160 microns in a lithium metal foil. Thus, in one embodiment with a thin absorption layer of lithium metal foil for absorption material 34 that is less than or equal to 160 microns thick, the energetic byproducts 32 and 33 can simultaneously escape both faces of the thin absorption layer. This improves detection reliability and efficiency from the larger detection signal from concurrent measurement of both energetic byproducts 32 and 33. In addition, the concurrent measurement of both energetic byproducts 32 and 33 enables mitigating any false-positive neutron detection. When the emission layers of the solid scintillation material 35 and 36 have a comparable thickness, an extremely compact detector results even when the detector contains up to hundreds of the absorption and emission layers.

In one embodiment, an absorption layer of absorption material 34 is a thin absorption layer when two energetic byproducts, such as energetic byproducts 32 and 33, are generated and the two energetic byproducts together have more than a fifty percent chance of both exiting the thin absorption layer on average including averaging over the point of absorption within the thin absorption layer and averaging over the possible random opposite directions for emission of the two energetic byproducts. In general, it is more likely than not that the energetic byproducts exit a thin absorption layer even when there are more than two energetic byproducts.

When the thin absorption layer of absorption material 34 is thin enough so that the energetic byproducts 32 and 33 usually escape into the solid scintillation material 35 and 36, the absorption material 34 might be so thin that the neutron 31 nearly always passes through the thin absorption layer of absorption material 34 without being absorbed in the absorption material 34. However, the stacked configuration of FIG. 1 or FIG. 2 avoids this apparent drawback. For example, if the neutron 31 has only a one percent chance of becoming absorbed in a single thin absorption layer of absorption material 34, a detector 10 or 20 with a hundred thin absorption layers raises the absorption probably to more than sixty percent across all of the thin absorption layers. In this embodiment, regardless of which thin absorption layer absorbs the neutron 31, all the energetic byproducts 32 and 33 of the neutron 31 usually escape into the adjacent emission layers of the solid scintillation material 35 and 36.

An advantage of embodiments of the invention is that the neutron 31 is reliably detectable even when neutron 31 is a thermal neutron with a kinetic energy of less than 1 eV, less than 0.1 eV, or even has about 0.025 eV of kinetic energy. Such a thermal neutron 31 is hard to reliably detect prior to the discovery of embodiments of the invention because such a thermal neutron 31 is non-ionizing radiation. In one embodiment, the neutron 31 merely needs to have enough energy to pass through the emission layer of the solid scintillation material 35 and reach the absorption layer of absorption material 34. Even this is not required in the embodiment of FIG. 2. The absorption of the neutron 31 and subsequent decay into energetic byproducts 32 and 33 amplifies the detectable energy of a thermal neutron from less than 1 eV to about a MeV of combined energy for the energetic byproducts 32 and 33 depending upon the specific absorption material 34. This dramatically increases the detection sensitivity. It will be appreciated that a neutron 31 with more than 1 eV of kinetic energy is also reliably detected, including detecting a neutron 31 a kinetic energy in the MeV range, but then the significant momentum of the neutron 31 impacts the travel direction of the energetic byproducts 32 and 33.

The detection sensitivity of certain embodiments of the invention includes not only efficient conversion of neutron 31 into energetic byproducts 32 and 33 that reach the solid scintillation material 35 and 36, but also efficient conversion of the energetic byproducts 32 and 33 into detectable photons within the solid scintillation material 35 and 36.

In one embodiment, the solid scintillation material 35 and 36 of the emission layers is a semiconductor material. The semiconductor material converts each of the energetic byproducts 32 and 33 into electron-hole pairs. Upon one or more energy level transitions towards recombination, the semiconductor material converts the electron-hole pairs into the photons. Because usually all of the energetic byproducts 32 and 33 reach respective ones of the solid scintillation material 35 and 36 due to the absorption layer of absorption material 34 being thin, detection sensitivity increases because the semiconductor material converts all the energetic byproducts 32 and 33 for a particular neutron 31 into detectable photons.

In another embodiment, the solid scintillation material 35 and 36 of the emission layers is an insulating material. The insulating material converts each of the energetic byproducts 32 and 33 into free electrons. Upon at least one transition towards recapture, the insulating material converts the free electrons into the photons. Because usually all of the energetic byproducts 32 and 33 reach respective ones of the solid scintillation material 35 and 36 due to the absorption layer of absorption material 34 being thin, detection sensitivity increases because the insulating material converts all the energetic byproducts 32 and 33 for a particular neutron 31 into detectable photons.

Because each of the generated photons typically has an energy matching the bandgap of the semiconductor material or the free energy of the insulation material of typically a few eV, and because the energetic byproducts 32 and 33 have combined energies of about a MeV, potentially thousands of photons up to nearly a million photons are created from the energetic byproducts 32 and 33. The combined energies of about a MeV of the energetic byproducts 32 and 33 is entirely converted into photons when the average path lengths 39 of the energetic byproducts 32 and 33 lies entirely with the solid scintillation material 35 and 36.

Thus in one embodiment, a thickness of each of the emission layers of the solid scintillation material 35 and 36 matches respective average path lengths 39 of the energetic byproducts 32 and 33 within the solid scintillation material 35 and 36.

However, thousands of photons are not needed to reliably detect the energetic byproducts 32 and 33. Instead, tens or hundreds of photons are plenty to reliably detect the energetic byproducts 32 and 33. Furthermore in a stacked configuration, if the energetic byproducts 32 and 33 pass through the emission layers of the solid scintillation material 35 and 36 without fully converting their energies into photons, the energetic byproducts 32 and 33 likely reach other emission layers of the solid scintillation material 35 and 36.

Thus in another embodiment, a total thickness of all of the emission layers matches respective average path lengths 39 of the energetic byproducts 32 and 33 within the solid scintillation material 35 and 36. This reduces the overall thickness of the detector and limits the nonproductive absorption of neutron 31 within the solid scintillation material 35 and 36.

In these embodiments, a thickness of the emission layers matches respective average path lengths 39 of the energetic byproducts 32 and 33 within the solid scintillation material 35 and 36.

In summary, a thickness of each of the thin absorption layers, such as the thin absorption layer of absorption material 34, is sufficiently less than respective path lengths 37 and 38 of each of the energetic byproducts within the absorption material 34, so that, when the energetic byproducts are two energetic byproducts 32 and 33 traveling in opposite directions, usually the energetic byproducts 32 and 33 exit opposite faces of the thin absorption layer and respectively enter the neighboring emission layers of the solid scintillation material 35 and 36, with the sensor detecting the photons from both the neighboring emission layer of the solid scintillation material 36 converting the energetic byproduct 32 and the neighboring emission layer of the solid scintillation material 35 converting the energetic byproduct 33.

From the above description of the Layered Scintillating Neutron Detector, it is manifest that various techniques may be used for implementing the concepts of detectors 10 and 20 without departing from the scope of the claims. The described embodiments are to be considered in all respects as illustrative and not restrictive. The detectors 10 and 20 disclosed herein may be practiced in the absence of any element that is not specifically claimed and/or disclosed herein. It should also be understood that each detector 10 or 20 is not limited to the particular embodiments described herein, but is capable of many embodiments without departing from the scope of the claims.

We claim:

1. A detector for detecting at least one neutron comprising:
    at least one thin absorption layer, each thin absorption layer including an absorption material for absorbing the at least one neutron and then radioactively decaying into a plurality of energetic byproducts;
    at least one emission layer, each emission layer including a solid scintillation material for converting the plurality of energetic byproducts into a plurality of photons;
    wherein each of the plurality of thin absorption layers is sandwiched between two of the plurality of emission layers for together converting the plurality of energetic byproducts from the at least one neutron into the plurality of photons; and
    a sensor for detecting the plurality of photons.

2. The detector of claim 1, wherein the at least one thin absorption layer comprises as many as 100 thin absorption layers for detecting at least one thermal neutron with a kinetic energy of less than 1 eV.

3. The detector of claim 1, wherein:
    said at least one thin absorption layer comprises a plurality of thin absorption layers;
    said least one emission layer comprises a plurality of emission layers; and
    wherein the plurality of thin absorption layers and the plurality of emission layers alternate within a stack in the detector.

4. The detector of claim 3, wherein a thickness of each of the plurality of thin absorption layers is sufficiently less than a respective path length of each of the plurality of energetic byproducts within the absorption material, so that, when the plurality of energetic byproducts are a first energetic byproduct and a second energetic byproduct traveling in opposite directions, usually the first energetic byproduct and the second energetic byproducts exit opposite faces of one of the plurality of thin absorption layers and respectively enter a first neighboring emission layer and a second neighboring emission layer of the plurality of emission layers, with the sensor detecting the plurality of photons from both the first neighboring emission layer converting the first energetic byproduct and the second neighboring emission layer converting the second energetic byproduct.

5. The detector of claim 1, wherein each of said at least one thin absorption layer is sandwiched between two of said least one emission layer for together converting the plurality of energetic byproducts from the at least one neutron into the plurality of photons.

6. The detector of claim 1, wherein a thickness of the at least one thin absorption layer is less than a respective average path length of each of the plurality of energetic byproducts within the absorption material.

7. The detector of claim 1, wherein a thickness of the at least one emission layer matches a respective average path length of each of the plurality of energetic byproducts within the solid scintillation material.

8. The detector of claim 1, wherein the absorption material of the at least one thin absorption layer s-comprises a solid.

9. The detector of claim 1, wherein the absorption material of the at least one thin absorption layer includes $^{10}B$, and the plurality of energetic byproducts of the $^{10}B$ absorbing the at least one neutron are an energetic $^{7}Li$ and an alpha particle.

10. The detector of claim 1, wherein the absorption material of the at least one thin absorption layer includes $^{6}Li$, and the plurality of energetic byproducts of the $^{6}Li$ absorbing the at least one neutron are a triton particle and an alpha particle.

11. The detector of claim 1, wherein each of said at least one thin absorption layer consists of a metal foil of the absorption material, which essentially consists of $^{6}Li$.

12. The detector of claim 1, wherein each of said at least one thin absorption layer consists of a thin sheet of a binder and the absorption material, which essentially consists of a powder of $^{6}LiF$.

13. The detector of claim 1, wherein the solid scintillation material of the at least one emission layer is a semiconductor material for converting each of the plurality of energetic byproducts into a plurality of electron hole pairs and, upon at least one transition towards a recombination, for converting the plurality of electron-hole pairs for all of the plurality of energetic byproducts into the plurality of photons.

14. The detector of claim 1, wherein the solid scintillation material of the at least one emission layer is an insulating material for converting each of the plurality of energetic byproducts into a plurality of free electrons and, upon at least one transition towards a recapture, for converting the plurality of free electrons for all of the plurality of energetic byproducts into the plurality of photons.

15. The detector of claim 1, wherein the solid scintillation material of the at least one emission layer is selected from the group consisting of an insulator, a semiconductor, a metal halide crystal, a metal oxide crystal, a salt, a glass, and a plastic.

16. The detector of claim 1, wherein the sensor includes a photomultiplier tube or a silicon photomultiplier for detecting the plurality of photons.

17. The detector of claim 1, further comprising an opaque reflective coating surrounding said at least one thin absorption layer, said at least one emission layer, and the sensor.

18. A detector for detecting at least one neutron comprising:
- a plurality of thin absorption layers, each on layer including an absorption material for absorbing the at least one neutron and then radioactively decaying into a plurality of energetic byproducts;
- a plurality of emission layers, each emission layer including a solid scintillation material for converting the plurality of energetic byproducts into a plurality of photons,
- wherein the plurality of thin absorption layers and the plurality of emission layers alternate within a stack in the detector;
- a sensor for detecting the plurality of photons; and
- an opaque reflective coating surrounding said plurality of thin absorption layers, said plurality of emission layers, and the sensor.

19. The detector of claim 18, wherein:
- the at least one neutron comprises a thermal neutron with a kinetic energy of less than 1 eV;
- each of the plurality of thin absorption layers is sandwiched between two of the plurality of emission layers for converting the plurality of energetic byproducts from the thermal neutron into the plurality of photons;
- each of the plurality of thin absorption layers consists of a solid selected from the group consisting of a metal foil of the absorption material consisting essentially of $^6$Li, a thin sheet consisting of a binder and the absorption material consisting essentially of a powder of $^6$LiF, and a thin boron layer of the absorption material consisting essentially of $^{10}$B;
- each of the plurality of energetic byproducts is selected from the group consisting of a triton particle, an alpha particle, and an energetic $^7$Li;
- each of the plurality of emission layers consists of the solid scintillation material selected from the group consisting of a semiconductor and an insulator; and
- the sensor includes a photomultiplier tube or a silicon photomultiplier for detecting the plurality of photons.

20. A detector for detecting at least one neutron comprising:
- a plurality of thin absorption layers, each thin absorption layer including an absorption material for absorbing the at least one neutron and then radioactively decaying into a plurality of energetic byproducts;
- a plurality of emission layers, each emission layer including a solid scintillation material for converting the plurality of energetic byproducts into a plurality of photons;
- wherein the plurality of thin absorption layers and the plurality of emission layers alternate within a stack in the detector;
- a sensor for detecting the plurality of photons;
- the at least one neutron comprises a thermal neutron with a kinetic energy of less than 1 eV;
- each of the plurality of thin absorption layers is sandwiched between two of the plurality of emission layers for converting the plurality of energetic byproducts from the thermal neutron into the plurality of photons;
- each of the plurality of thin absorption layers consists of a solid selected from the group consisting of a metal foil of the absorption material consisting essentially of $^6$Li, a thin sheet consisting of a binder and the absorption material consisting essentially of a powder of $^6$LiF, and a thin boron layer of the absorption material consisting essentially of $^{10}$B;
- each of the plurality of energetic byproducts is selected from the group consisting of a triton particle, an alpha particle, and an energetic $^7$Li;
- each of the plurality of emission layers consists of the solid scintillation material selected from the group consisting of a semiconductor and an insulator; and
- the sensor includes a photomultiplier tube or a silicon photomultiplier for detecting the plurality of photons.

* * * * *